United States Patent
Ginter et al.

(10) Patent No.: US 12,263,442 B2
(45) Date of Patent: Apr. 1, 2025

(54) SYSTEMS AND METHODS FOR CARBON CAPTURE

(71) Applicant: Caterpillar Inc., Peoria, IL (US)

(72) Inventors: David M. Ginter, Peoria, IL (US); Nikolas Karl Landin, Colorado Springs, CO (US); David T. Montgomery, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 457 days.

(21) Appl. No.: 17/720,991

(22) Filed: Apr. 14, 2022

(65) Prior Publication Data

US 2023/0330595 A1    Oct. 19, 2023

(51) Int. Cl.
*B01D 53/62* (2006.01)
*B01D 53/94* (2006.01)
*C01B 3/16* (2006.01)

(52) U.S. Cl.
CPC .............. *B01D 53/62* (2013.01); *B01D 53/94* (2013.01); *C01B 3/16* (2013.01); *B01D 2257/504* (2013.01); *B01D 2258/01* (2013.01); *C01B 2203/0233* (2013.01); *C01B 2203/0475* (2013.01); *C01B 2203/066* (2013.01)

(58) Field of Classification Search
CPC .. B01D 53/94; B01D 53/62; B01D 2257/504; B01D 2258/01; C01B 3/16; C01B 2203/0233; C01B 2203/0475; C01B 2203/066

USPC ......................................................... 423/220
See application file for complete search history.

(56) References Cited

U.S. PATENT DOCUMENTS

| | | | |
|---|---|---|---|
| 7,752,848 B2 | 7/2010 | Balan et al. | |
| 9,365,131 B2 | 6/2016 | Jamal et al. | |
| 10,297,849 B2 | 5/2019 | Diethelm et al. | |
| 10,597,292 B2 | 3/2020 | Mokheimer et al. | |
| 10,749,196 B2 | 8/2020 | Raaheim et al. | |
| 11,125,188 B2 | 9/2021 | Ginter et al. | |
| 2009/0117024 A1 | 5/2009 | Weedon et al. | |
| 2015/0159126 A1 | 6/2015 | Makowsky et al. | |

*Primary Examiner* — Anita Nassiri-Motlagh
(74) *Attorney, Agent, or Firm* — Lee & Hayes, P.C.

(57) ABSTRACT

A carbon capture system includes a hydrogen production module. The hydrogen production module is used to control the amount of hydrogen entering an internal combustion engine to reduce an amount of water vapor generated by the internal combustion engine, thereby increasing the efficiency of the carbon capture device. If too much water vapor is detected in an exhaust of the engine, the amount of hydrogen produced by a hydrogen production module can be increased, thereby reducing the amount of hydrogen entering the engine and reducing the amount of water vapor generated by the engine. A reformer catalyst can be used by the hydrogen production module to remove at least a portion of hydrogen in a fuel stream of the engine.

13 Claims, 5 Drawing Sheets

SYSTEMS AND METHODS FOR CARBON CAPTURE

TECHNICAL FIELD

The present disclosure relates generally to systems using carbon capture, and more particularly, to an electric power generation system using a hydrogen removal system in a carbon capture system to control water vapor production.

BACKGROUND

The use of internal combustion engines can produce greenhouse gases (GHG). Greenhouse gases are generally defined to be gases that absorb and emit radiant energy in a thermal infrared range. This absorption/emission effect is termed the "greenhouse gas effect," contributing to an increase in the average temperature of the Earth's surface. The most common GHGs include water vapor, carbon dioxide, methane, nitrous oxide, and ozone. Because of concerns relating to air pollution and global warming, it has become a goal in some industries to reduce GHG generation from various sources, including internal combustion engines.

Internal combustion engines, engines that burn fossil fuels for transportation, electrical power generation, and the like, are a major source of carbon dioxide, the largest component of GHGs in the atmosphere. Uses of internal combustion engines in transportation produce about thirty percent of GHG emissions, while electricity production produces about twenty five percent of GHG transmissions. Because of the increased need or desire in the industry to reduce GHG transmissions into the atmosphere, it has become desirable to use carbon capture systems to capture carbon dioxide.

A mechanism for carbon capture is described in U.S. Pat. No. 9,365,131 (hereinafter referred to as "the '131 reference"). The '131 reference describes using a solid oxide fuel cell system to produce a refined carbon dioxide product. The system uses a hydrocarbon fuel and steam as inputs, whereby a reformer combusts the hydrocarbon fuel and hydrogen in a desired molar ratio with oxygen so that all the hydrogen is combusted, producing the refined carbon dioxide. However, the system described in the '131 reference can require the use of a significant amount of energy, such as heating a water source to make the steam necessary for the production of the refined carbon dioxide, thereby potentially reducing the efficiency and practicality of the system. Further, the processes noted in the '131 reference are tailored for use with solid oxide fuel cell systems. As a result, the technologies described in the '131 reference may not be economically viable and are limited to specific use cases centered on solid oxide fuel cell systems.

Examples of the present disclosure are directed to overcoming deficiencies of such systems.

SUMMARY

In one aspect of the present disclosure, a system includes an internal combustion engine comprising an intake and an exhaust, the intake being configured to receive an engine operating fluid comprising a mixture of air, natural gas, and reformed fuel, wherein the reformed fuel is provided by a hydrogen production module, a carbon capture device fluidly connected to the exhaust, the carbon capture device being configured to receive exhaust gas from the exhaust, and to remove carbon dioxide from the exhaust gas, and a hydrogen production module fluidly connected to the intake, and including a recirculation circuit having a reformer catalyst module, the hydrogen production module being configured to produce the reformed fuel by removing hydrogen gas from fluids in the recirculation circuit using the reformer catalyst module, the fluids comprising reformer natural gas. The hydrogen production module comprises a hydrogen control module configured to increase or decrease an amount of the hydrogen gas removed from the fluids to control a concentration of water vapor in the exhaust gas, wherein an increase in the hydrogen gas removed decreases an amount of hydrogen gas in the engine operating fluid, thereby decreasing the concentration of water vapor in the exhaust gas, and wherein a decrease in the hydrogen gas removed increases the amount of hydrogen gas in the engine operating fluid, thereby increasing the concentration of water vapor in the exhaust gas.

In another aspect of the present disclosure, a method includes determining an amount of water vapor in an exhaust gas produced by an engine, determining if the amount of water vapor in an exhaust gas of the engine provided to a carbon capture device is at or above a first setpoint, at or below a second setpoint, or between the first setpoint and the second setpoint; and if the amount of water vapor is at or above the first setpoint, increasing an amount of hydrogen gas extracted by a hydrogen production module to decrease an amount of hydrogen gas combusted by the engine, thereby decreasing water vapor production, if the amount of water vapor is at or below the second setpoint, decreasing an amount of hydrogen gas extracted by a hydrogen production module to increase the amount of hydrogen gas combusted by the engine, thereby increasing water vapor production, and if the amount of water vapor is between the first setpoint and the second setpoint, maintaining a configuration to maintain the amount of hydrogen gas combusted by the engine.

In a still further aspect of the present disclosure, a carbon capture system includes an internal combustion engine connected to an inlet duct, the internal combustion engine including a shaft, a generator connected to the shaft of the engine and operable to produce an electrical power output when the engine is operating, a carbon capture device configured to remove at least a portion of carbon dioxide from an exhaust of the engine, a hydrogen production module configured to remove a hydrogen gas using a reformer catalyst from fluids in a recirculation conduit provided through the inlet duct to the engine, the, the fluids comprising reformer natural gas, wherein the hydrogen production module is configured to increase or decrease an amount of the hydrogen gas removed to control a concentration of water vapor in the exhaust of the engine, and a water vapor detector configured to detect a concentration of water in the exhaust of the engine and provide a water vapor reading to the hydrogen production module, wherein the hydrogen production module uses the water vapor reading to increase, decrease, or maintain an amount of the hydrogen gas removed.

DETAILED DESCRIPTION

Technologies described below are directed to systems and methods for increasing concentration of carbon dioxide produced in internal combustion systems for use in carbon capture technologies by using a hydrogen production module. Wherever possible, the same reference numbers will be used throughout the drawings to refer to the same or like parts.

Figure 1:
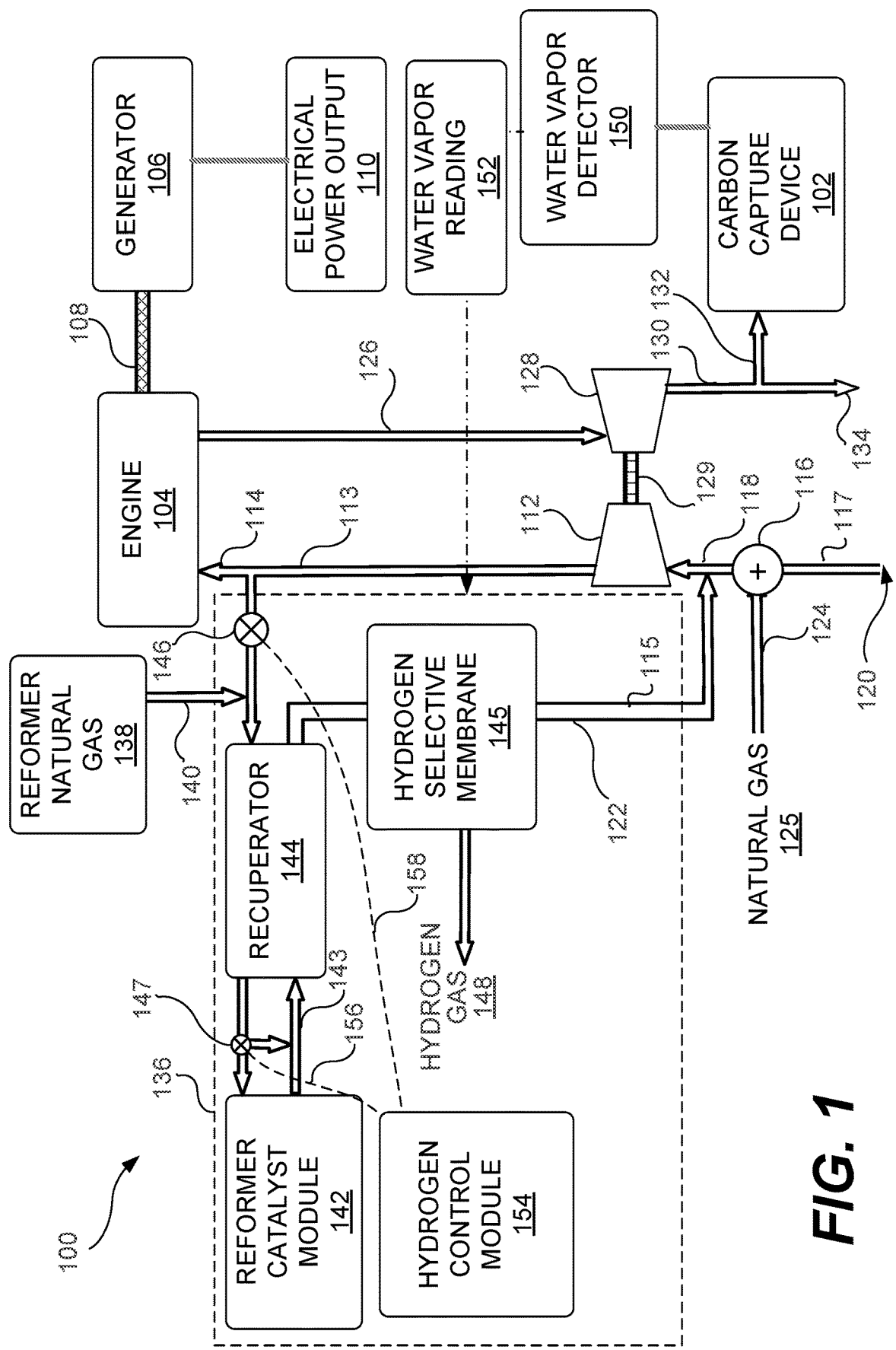
FIG. 1 is a schematic illustration of a low-pressure electrical power generation system with a carbon capture device, in accordance with examples of the presently disclosed subject matter.

FIG. 1 is a schematic illustration of a low-pressure electrical power generation system 100 with a carbon capture device 102, in accordance with examples of the presently disclosed subject matter. The carbon capture device 102 can use various technologies including, but not limited to, membrane, oxyfuel combustion, absorption, multiphase absorption, chemical looping combustion, calcium looping, and cryogenic capture devices. In some examples, carbon scrubbing with amines (a form of absorption) is used on vessels such as boats, work machines, vehicles, and industrial plants. The presently disclosed subject matter is not limited to any particular carbon capture technology.

The system 100 further includes an engine 104 and a generator 106. The engine 104 is rotatably attached to the generator 106 by shaft 108. The engine 104 is a hydrocarbon fuel-based reciprocating piston internal combustion engine, although other engine types such as continuous combustion or turbine engines may be used. When the engine 104 is in operation, the engine 104 rotates the shaft 108. The shaft 108 rotates windings within the generator 106, thereby producing electrical power. The generator 106 produces an electrical power output 110 during the operation of the engine 104. The engine 104 and the generator 106 can be a single unit or can be separate units, the presently disclosed subject matter not being limited to any particular engine/generator configuration. Further, the generator 106 may produce alternating current or direct current electrical power, the presently disclosed subject matter not being limited to any particular type of electrical power output 110 generated. It should further be noted that the presently disclosed subject matter is not limited to uses whereby the engine 104 is used to produce electrical power via a generator 106. The presently disclosed subject matter includes uses of the engine 104 whereby the engine 104 provides other forms of power, such as motive force through a drivetrain to move a vehicle, rotate a propellor, and the like.

As shown, the system 100 further includes a compressor 112 operably connected to the engine 104. For example, the compressor 112 is fluidly connected to an inlet of the engine 104 and is configured to compress an engine operating fluid 113 provided through an inlet duct 114. The engine operating fluid 113 in the embodiment shown is a mixture of natural gas 125, reformed fuel 115 introduced through a recirculation conduit 122, and air 117 introduced through an air inlet 120. The natural gas 125, which is primarily methane but can include other naturally occurring gases such as carbon dioxide, nitrogen, hydrogen sulfide, or helium, can be provided by various sources including, but not limited to, natural gas from mining operations. The natural gas 125, which is provided through a gas conduit 124, is mixed with the air 117 in a mixer 116. The mixer 116 is a gas mixer that receives two or more gases, such as the air 117 and the natural gas 125 and combines (or blends) the gases. The mixture of the air 117 and the natural gas 125 is added to the reformed fuel 115 in a mixed conduit 118 and compressed by the compressor 112 for introduction to the engine 104 through the inlet duct 114 as fuel for the engine 104. In some examples, the mixed conduit 118 acts as a mixer (or blender) whereby the fluids (or gases) entering the mixed conduit 118 combine through the movement of the gases in the mixed conduit. Exhaust gas 126 created during operation of the engine 104 passes through a turbine 128, whereby the exhaust gas 126 expands in the turbine 128. The expansion of the exhaust gas 126 rotates the shaft 129. The rotation of the shaft 129 rotates compressor blades (not shown) of the compressor 112, compressing the mixture of the air 117, the natural gas 125, and the reformed fuel 115. The expanded exhaust gas 126 leaving the turbine is expelled into an exhaust conduit 130. From the exhaust conduit 130, the expanded exhaust gas 126 is directed to the carbon capture device 102 through capture conduit 132 or to the atmosphere through exhaust outlet 134.

The engine 104 is associated with a hydrogen production module (HPM) 136. The HPM 136 advantageously communicates and is operably associated with the engine 104 to, together, define the system 100. The HPM 136 includes various components that selectively and scaleably produce, refine and/or purify or separate hydrogen gas from gaseous fuel, for example the natural gas provided through the gas conduit 124 or reformer natural gas 138 through reformer gas conduit 140. In the example illustrated, the HPM 136 includes a reformer catalyst module 142 as part of the HPM 136. In some examples, the reformer catalyst module 142 includes a partial oxidation reformer (POx-R) catalyst that converts rich gaseous fuel-air mixture at high temperature to a hydrogen-rich reformate 143. A recuperator 144, a heat exchanger, is used to preheat fluid moving into the reformer catalyst module 142. In some examples, the recuperator 144 is a heat exchanger that uses tubes to allow the transfer of heat from one fluid to the other. In the example illustrated, relatively cooler gases from the inlet duct 114, as compared to the reformate 143 exchange heat in the recuperator 144 with relatively hotter reformate 143 flowing from the reformer catalyst module 142. In this manner, the conversion efficiency at the reformer catalyst module 142 can be increased. A hydrogen selective membrane 145 receives reformate 143 from the reformer catalyst module 142, which may still be heated or reheated, and extracts between 0% and 75% of the hydrogen from the reformate 143. The extracted hydrogen gas 148, which is pure hydrogen gas ($H_2$), is provided at a dedicated conduit and can be collected for storage or removal off system. The reformed fuel 115 is a hydrogen-depleted tail gas mixture, which may contain traces of hydrogen, carbon monoxide, nitrogen, and the like. As noted above, the reformed fuel 115 is combined with the natural gas 125 and air 117 as fuel for the engine 104.

The HPM 136 can be used for various purposes. For example, the HPM 136 can be used to produce the hydrogen gas 148 for other systems or uses. In another manner, the HPM 136 can be used in conjunction with the carbon capture device 102. As noted above, during the operation of the engine 104, various GHGs are produced, including carbon dioxide and water vapor. During use, the presence of water vapor can affect the operation of the carbon capture device 102. For example, in an amine carbon capture (scrubbing) system, water is often added to the solution used in the scrubber to remove water vapor. An excess of water vapor can cause an increased amount of water absorbed into the amine solution and potentially saturating the solution to a point where both the water vapor and carbon dioxide are not absorbed into the solution as well as desired or expected. Further, if not captured, as noted above, water vapor itself is a major GHG. Hydrogen present in the reformed fuel 115 can increase the amount of hydrogen in the fuel to the engine 104. When combusted in the presence of oxygen, hydrogen combines with the oxygen to form water vapor. To reduce or control the amount of water vapor produced by the engine 104, the concentration of hydrogen in the inlet duct 114 is controlled by the HPM 136. While in some examples, a portion of hydrogen is maintained to help stabilize the combustion of the engine 104, the HPM 136 is used to control the amount of hydrogen to maintain a concentration of water vapor introduced into the carbon capture device 102.

To control the amount of water vapor generated from the operation of the engine 104, the HPM 136 increases or decreases an amount of the hydrogen gas 148 removed, thereby controlling the amount of water vapor generated. As noted above, hydrogen may still be desired as a part of the fuel of the engine 104 to stabilize combustion within the engine 104. The HPM 136 uses a reformer flow control valve 146 to adjust the pressure in the HPM 136 and a catalyst bypass valve 147 to control the amount of gases entering the reformer catalyst module 142. The HPM 136 of FIG. 1 is a low-pressure system, whereby gases moving through the HPM 136 are at a relatively low pressure such as at or near atmospheric pressure. The reformer flow control valve 146 is a throttle valve that receives a portion of the engine operating fluid 113 at the compressed pressure resulting from the compressor 112 and restricts the flow of the portion of the engine operating fluid 113 into the recuperator 144. The restriction causes a pressure drop across the flow control valve 146 to reduce the pressure of the engine operating fluid 113 entering the HPM 136 from the pressure of the engine operating fluid 113 entering the engine 104.

To control the amount of the hydrogen gas 148 separated by the hydrogen selective membrane 145, the catalyst bypass valve 147 is used. The catalyst bypass valve 147 selectively permits fluid to flow into the reformer catalyst module 142 or in whole or in part bypass the reformer catalyst module 142. The amount of fluid bypassing the reformer catalyst module 142 changes the amount of the hydrogen gas 148 produced, thereby changing the amount of water vapor produced during combustion. When allowed to enter the reformer catalyst module 142, the reformer catalyst module 142 produces an amount of the hydrogen gas 148 relative to the bypass position of the catalyst bypass valve 147. When in a fully bypassed position, no hydrogen gas 148 is produced because no fluid enters the reformer catalyst module 142. When in a non-bypassed position, whereby no fluid bypasses the reformer catalyst module 142, the reformer catalyst module 142 produces an amount of the hydrogen gas 148 of which the reformer catalyst module 142 is capable of producing. Adjusting the position of the catalyst bypass valve 147 from a fully bypassed position to a non-bypassed position adjusts the amount of the hydrogen gas 148 produced and separated by the hydrogen selective membrane 145. In another example, decreasing the amount of the hydrogen gas 148 produced can also be accomplished by decreasing the flow of the reformer natural gas 138 and increasing the amount of the hydrogen gas 148 produced can also be accomplished by increasing the flow of the reformer natural gas 138. As a primary contributor of hydrogen, increasing or decreasing the flow of the reformer natural gas 138 increases or decreases the amount of hydrogen available for combustion by the engine 104, thereby changing the amount of water vapor produced.

The system 100 uses the catalyst bypass valve 147 to adjust the amount of the hydrogen gas 148 produced. Decreasing the amount of the hydrogen gas 148 produced increases the amount of the hydrogen present in the fuel to the engine 104, thereby increasing the amount of water vapor present in the exhaust of the engine 104. Similarly, increasing the amount of the hydrogen gas 148 produced decreases the amount of the hydrogen present in the fuel to the engine 104, thereby decreasing the amount of water vapor present in the exhaust of the engine 104. Although stoichiometric ratios of fluids and their composition in the fuel to the engine 104 can be used to estimate the amount of water vapor present in the exhaust, illustrated by way of example in FIGS. 3 and 4, the system 100 of FIG. 1 includes a water vapor detector 150.

The water vapor detector 150 is used to detect the amount of water vapor (or water if the vapor is cooled and/or condensed) in the capture conduit 132 going into the carbon capture device 102. The water vapor detector 150 measures the amount of water vapor in the capture conduit 132 and transmits a water vapor reading 152 to a hydrogen control module 154 of the HPM 136. The hydrogen control module 154 receives the water vapor reading 152 and determines if the water vapor reading 152 is above a threshold (high setpoint), below a threshold (low setpoint) or within a desired range. If the hydrogen control module 154 determines the water vapor reading 152 is above the high setpoint, the hydrogen control module 154 sends a signal 156 to increase the bypass position of the catalyst bypass valve 147, reducing the amount of the hydrogen gas 148 produced, and thereby reducing the amount of water vapor produced by the engine 104. If the hydrogen control module 154 determines the water vapor reading 152 is below the low setpoint, the hydrogen control module 154 sends the signal 156 to decrease the bypass position of the catalyst bypass valve 147, increasing the amount of the hydrogen gas 148 produced, and thereby increasing the amount of water vapor produced by the engine 104. In some examples, the hydrogen control module 154 also controls the amount of the fuel entering the HPM 136 or the pressure in the HPM 136 by sending control signal 158 to control the position of the reformer flow control valve 146. Opening the reformer flow control valve 146 to a more open position increases the pressure in the HPM 136, and conversely, closing the reformer flow control valve 146 to a more closed position decreases the pressure in the HPM 136.

In FIG. 1, the HPM 136, by changing the position of the catalyst bypass valve 147 by sending control signal 156 to the catalyst bypass valve 147, controls the amount of water vapor that is introduced into the carbon capture device 102. By controlling the amount of water vapor, the performance of the carbon capture device 102 can be maintained. In FIG. 1, the recirculation conduit 122 and the components used to extract (or produce) the hydrogen gas 148, e.g. the reformer catalyst module 142, the HPM 136, and the like, are configured to operate at a relatively low pressure. The reformer flow control valve 146 provides a pressure drop across the reformer flow control valve 146 to reduce the pressure from the intake pressure of the engine 104 to a lower pressure for the operating of the HPM 136. However, in some systems, HPM is configured to operate at a relatively higher pressure than the configuration described in FIG. 1, described in more detail in FIG. 2.

Figure 2:
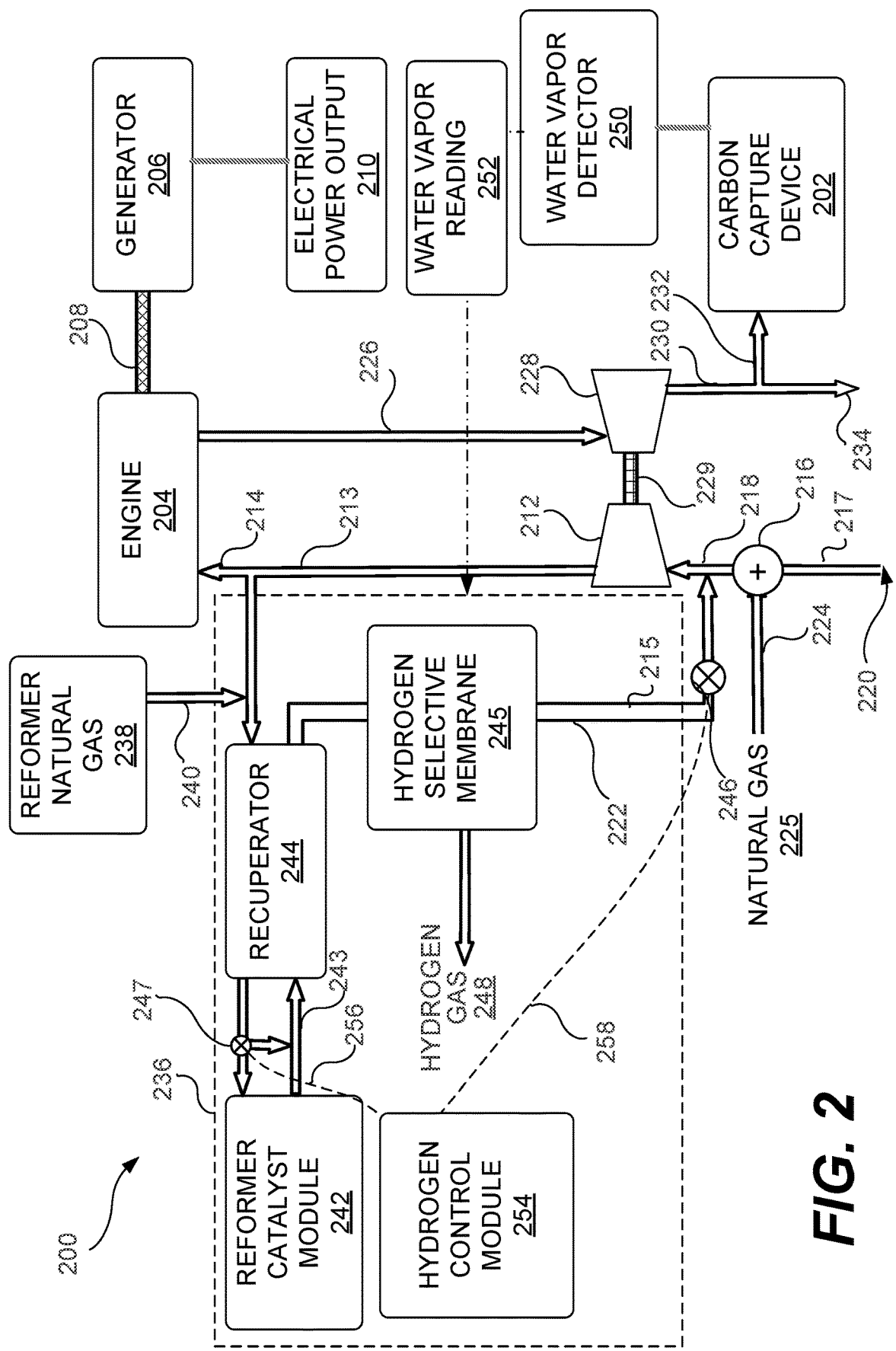
FIG. 2 is a schematic illustration of an intake pressure electrical power generation system with a carbon capture device, in accordance with examples of the presently disclosed subject matter.

FIG. 2 is a schematic illustration of an intake pressure electrical power generation system 200 with a carbon capture device 202, in accordance with examples of the presently disclosed subject matter. The system 200 of FIG. 2 is configured to operate at or near an intake pressure of an engine, described in more detail below. The carbon capture device 202 can use various technologies including, but not limited to, membrane, oxyfuel combustion, absorption, multiphase absorption, chemical looping combustion, calcium looping, and cryogenic capture devices. In some examples, carbon scrubbing with amines (a form of absorption) is used on vessels such as boats, work machines, vehicles, and industrial plants. The presently disclosed subject matter is not limited to any particular carbon capture technology.

The system 200 further includes an engine 204 and a generator 206. The engine 204 is rotatably attached to the generator 206 by shaft 208. The engine 204 is a hydrocarbon fuel-based reciprocating piston internal combustion engine, although other engine types such as continuous combustion or turbine engines may be used. When the engine 204 is in operation, the engine 204 rotates the shaft 208. The shaft 208 rotates windings within the generator 206, thereby producing electrical power. The generator 206 produces an electrical power output 210 during the operation of the engine 204. The engine 204 and the generator 206 can be a single unit or can be separate units, the presently disclosed subject matter not being limited to any particular engine/generator configuration. Further, the generator 206 may produce alternating current or direct current electrical power, the presently disclosed subject matter not being limited to any particular type of electrical power output 210 generated. It should further be noted that the presently disclosed subject matter is not limited to uses whereby the engine 204 is used to produce electrical power via a generator 206. The presently disclosed subject matter includes uses of the engine 204 whereby the engine 204 provides other forms of power, such as motive force through a drivetrain to move a vehicle, rotate a propellor, and the like.

As shown, the system 200 further includes a compressor 212 operably connected to the engine 204. For example, the compressor 212 is fluidly connected to an inlet of the engine 204 and is configured to compress an engine operating fluid 213 provided through an inlet duct 214. The engine operating fluid 213 in the embodiment shown is a mixture of natural gas 225, reformed fuel 215 introduced through a recirculation conduit 222, and air 217 introduced through an air inlet 220. The natural gas 225, which is primarily methane but can include other naturally occurring gases such as carbon dioxide, nitrogen, hydrogen sulfide, or helium, can be provided by various sources including, but not limited to, natural gas from mining operations. The natural gas 225, which is provided through a gas conduit 224, is mixed with the air 217 in a mixer 216. The mixer 216 is a gas mixer that receives two or more gases, such as the air 217 and the natural gas 225 and combines (or blends) the gases. The mixture of the air 217 and the natural gas 225 is added to the reformed fuel 215 in a mixed conduit 218 and compressed by the compressor 212 for introduction to the engine 204 through the inlet duct 214 as fuel for the engine 204. In some examples, the mixed conduit 218 acts as a mixer (or blender) whereby the fluids (or gases) entering the mixed conduit 218 combine through the movement of the gases in the mixed conduit. Exhaust gas 226 created during operation of the engine 204 passes through a turbine 228, whereby the exhaust gas 226 expands in the turbine 228. The expansion of the exhaust gas 226 rotates the shaft 229. The rotation of the shaft 229 rotates compressor blades (not shown) of the compressor 212, compressing the mixture of the air 217, the natural gas 225, and the reformed fuel 215. The expanded exhaust gas 226 leaving the turbine is expelled into an exhaust conduit 230. From the exhaust conduit, the expanded exhaust gas 226 is directed to the carbon capture device 202 through capture conduit 232 or to the atmosphere through exhaust outlet 234.

The engine 204 is associated with a hydrogen production module (HPM) 236. The HPM 236 advantageously communicates and is operably associated with the engine 204 to, together, define the system 200. The HPM 236 includes various components that selectively and scaleably produce, refine and/or purify or separate hydrogen gas from gaseous fuel, for example the natural gas provided through the gas conduit 224 or reformer natural gas 238 through reformer gas conduit 240. In the example illustrated, the HPM 236 includes a reformer catalyst module 242 as part of the HPM 236. In some examples, the reformer catalyst module 242 includes a partial oxidation reformer (POx-R) catalyst that converts rich gaseous fuel-air mixture at high temperature to a hydrogen-rich reformate 243. A recuperator 244, a heat exchanger, is used to preheat fluid moving into the reformer catalyst module 242. In some examples, the recuperator 244 is a heat exchanger that uses tubes to allow the transfer of heat from one fluid to the other. In the example illustrated, relatively cooler gases from the inlet duct 214, as compared to the reformate 243 exchange heat in the recuperator 244 with relatively hotter reformate 243 flowing from the reformer catalyst module 242. In this manner, the conversion efficiency at the reformer catalyst module 242 can be increased. A hydrogen selective membrane 245 receives reformate 243 from the reformer catalyst module 242, which may still be heated or reheated, and extracts between 0% and 75% of the hydrogen from the reformate 243. The extracted hydrogen gas 248, which is pure hydrogen gas ($H_2$), is provided at a dedicated conduit and can be collected for storage or removal off system. The reformed fuel 215 is a hydrogen-depleted tail gas mixture, which may contain traces of hydrogen, carbon monoxide, nitrogen, and the like. As noted above, the reformed fuel 215 is combined with the natural gas 225 and air 217 as fuel for the engine 204.

The HPM 236 can be used for various purposes. For example, the HPM 236 can be used to produce the hydrogen gas 248 for other systems or uses. In another manner, the HPM 236 can be used in conjunction with the carbon capture device 202. As noted above, during the operation of the engine 204, various GHGs are produced, including carbon dioxide and water vapor. During use, the presence of water vapor can affect the operation of the carbon capture device 202. For example, in an amine carbon capture (scrubbing) system, water is often added to the solution used in the scrubber to remove water vapor. An excess of water vapor can cause an increased amount of water absorbed into the amine solution and potentially saturating the solution to a point where both the water vapor and carbon dioxide are not absorbed into the solution as well as desired or expected. Further, if not captured, as noted above, water vapor itself is a major GHG. Hydrogen present in the reformed fuel 215 can increase the amount of hydrogen in the fuel to the engine 204. When combusted in the presence of oxygen, hydrogen combines with the oxygen to form water vapor. To reduce or control the amount of water vapor produced by the engine 204, the concentration of hydrogen in the inlet duct 214 is controlled by the HPM 236. While in some examples, a portion of hydrogen is maintained to help stabilize the combustion of the engine 204, the HPM 236 is used to control the amount of hydrogen to maintain a concentration of water vapor introduced into the carbon capture device 202.

To control the amount of water vapor generated from the operation of the engine 204, the HPM 236 increases or decreases an amount of the hydrogen gas 248 removed, thereby controlling the amount of water vapor generated. As noted above, hydrogen may still be desired as a part of the fuel of the engine 204 to stabilize combustion within the engine 204. The HPM 236 uses a reformer flow control valve 246 to adjust the pressure in the HPM 236and a catalyst bypass valve 247 to control the amount of gases entering the reformer catalyst module 242, described in more detail below: The HPM 236 of FIG. 2 is a high-pressure system, whereby gases moving through the HPM 236 are at the relatively high pressure of the engine operating fluid 213 at the compressed pressure resulting from the compressor 212.

To control the amount of the hydrogen gas 248 separated by the hydrogen selective membrane 245, the catalyst bypass valve 247 is used. The catalyst bypass valve 247 selectively permits fluid to flow into the reformer catalyst module 242 or in whole or in part bypass the reformer catalyst module 242. The amount of fluid bypassing the reformer catalyst module 242 changes the amount of the hydrogen gas 248 produced, thereby changing the amount of water vapor produced during combustion. When allowed to enter the reformer catalyst module 242, the reformer catalyst module 242 produces an amount of the hydrogen gas 248 relative to the bypass position of the catalyst bypass valve 247. When in a fully bypassed position, no hydrogen gas 248 is produced because no fluid enters the reformer catalyst module 242. When in a non-bypassed position, whereby no fluid bypasses the reformer catalyst module 242, the reformer catalyst module 242 produces an amount of the hydrogen gas 248 of which the reformer catalyst module 242 is capable of producing. Adjusting the position of the catalyst bypass valve 247 from a fully bypassed position to a non-bypassed position adjusts the amount of the hydrogen gas 248 produced and separated by the hydrogen selective membrane 245.

The system 200 uses the catalyst bypass valve 247 to adjust the amount of the hydrogen gas 248 produced. Decreasing the amount of the hydrogen gas 248 produced increases the amount of the hydrogen present in the fuel to the engine 204, thereby increasing the amount of water vapor present in the exhaust of the engine 204. Similarly, increasing the amount of the hydrogen gas 248 produced decreases the amount of the hydrogen present in the fuel to the engine 204, thereby decreasing the amount of water vapor present in the exhaust of the engine 204. Although stoichiometric ratios of fluids and their composition in the fuel to the engine 204 can be used to estimate the amount of water vapor present in the exhaust, illustrated by way of example in FIGS. 3 and 4, the system 200 of FIG. 2 includes a water vapor detector 250.

The water vapor detector 250 is used to detect the amount of water vapor (or water if the vapor is cooled and/or condensed) in the capture conduit 232 going into the carbon capture device 202. The water vapor detector 250 measures the amount of water vapor in the capture conduit 232 and transmits a water vapor reading 252 to a hydrogen control module 254 of the HPM 236. The hydrogen control module 254 receives the water vapor reading 252 and determines if the water vapor reading 252 is above a threshold (high setpoint), below a threshold (low setpoint) or within a desired range. If the hydrogen control module 254 determines the water vapor reading 252 is above the high setpoint, the hydrogen control module 254 sends a signal 256 to increase the bypass position of the catalyst bypass valve 247, reducing the amount of the hydrogen gas 248 produced, and thereby reducing the amount of water vapor produced by the engine 204. If the hydrogen control module 254 determines the water vapor reading 252 is below the low setpoint, the hydrogen control module 254 sends the signal 256 to decrease the bypass position of the catalyst bypass valve 247, increasing the amount of the hydrogen gas 248 produced, and thereby increasing the amount of water vapor produced by the engine 204. In some examples, the hydrogen control module 254 also controls the amount of the fuel entering the HPM 236 or the pressure in the HPM 236 by controlling the position of the reformer flow control valve 246 by sending control signal 258 to control the position of the reformer flow control valve 246. Opening the reformer flow control valve 246 to a more open position decreases the pressure in the HPM 236 by reducing fluid flow through the reformer flow control valve 246, and conversely, closing the reformer flow control valve 246 to a more closed position increases the pressure in the HPM 236 by restricting the flow through the reformer flow control valve 246.

In FIG. 2, the HPM 236, by changing the position of the catalyst bypass valve 247, controls the amount of water vapor that is introduced into the carbon capture device 202. By controlling the amount of water vapor, the performance of the carbon capture device 202 can be maintained. In FIG. 1, HPM 136 is configured to operate at a relatively low pressure. In FIG. 2, the HPM 236 is configured to operate at a relatively higher pressure. The examples described in FIGS. 1 and 2 use intake pressure at the engine to maintain pressure in the hydrogen production loop, e.g. the recirculation conduit 122 or 222. However, in some examples, the pressure may be provided by the exhaust pressure from the engine, described in more detail in FIG. 3.

Figure 3:
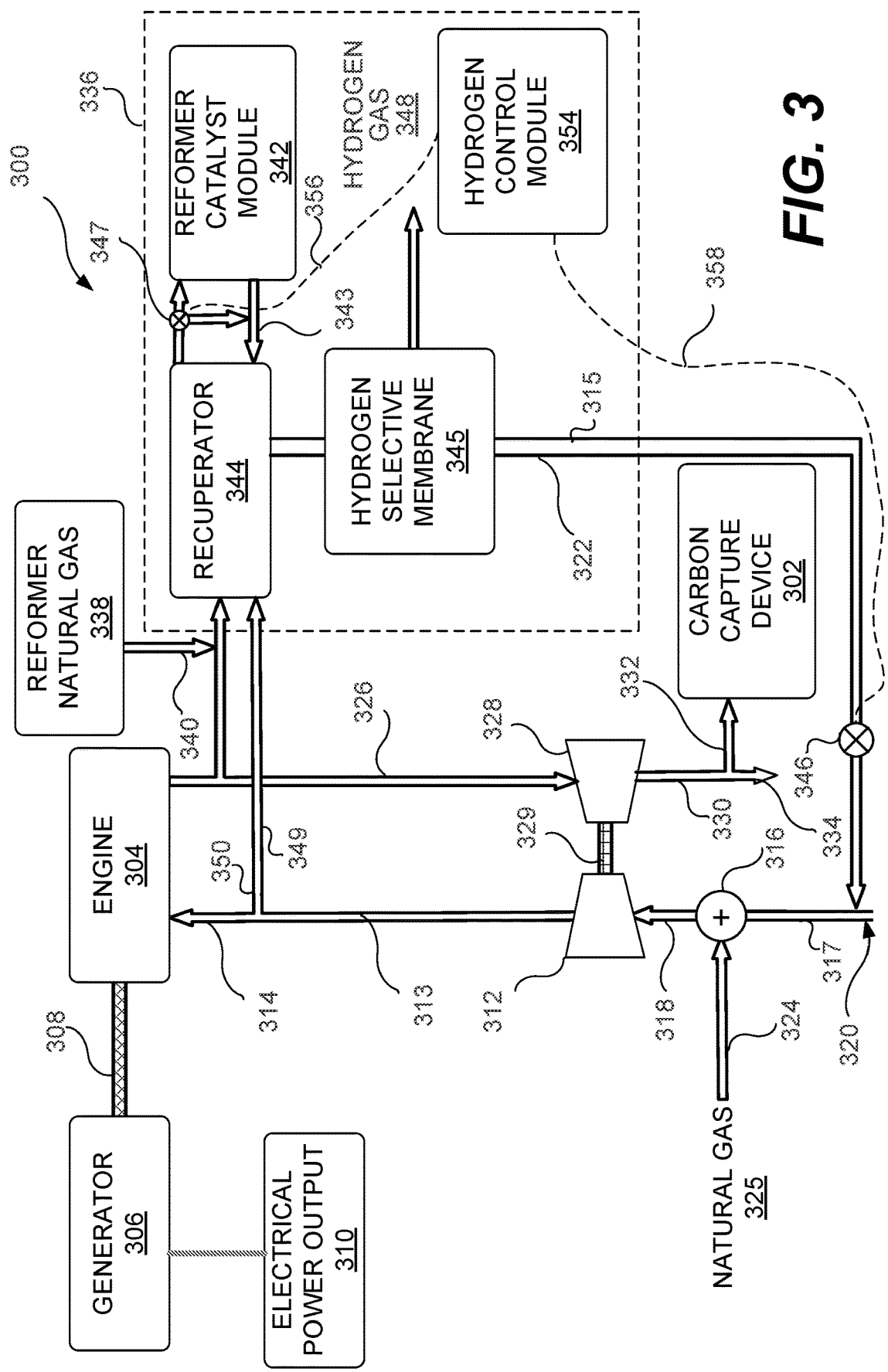
FIG. 3 is a schematic illustration of an exhaust pressure electrical power generation system with a carbon capture device, in accordance with examples of the presently disclosed subject matter.

FIG. 3 is a schematic illustration of an exhaust pressure electrical power generation system 300 with a carbon capture device 302, in accordance with examples of the presently disclosed subject matter. The carbon capture device 302 can use various technologies including, but not limited to, membrane, oxyfuel combustion, absorption, multiphase absorption, chemical looping combustion, calcium looping, and cryogenic capture devices. In some examples, carbon scrubbing with amines (a form of absorption) is used on vessels such as boats, work machines, vehicles, and industrial plants. The presently disclosed subject matter is not limited to any particular carbon capture technology.

The system 300 further includes an engine 304 and a generator 306. The engine 304 is rotatably attached to the generator 306 by shaft 308. The engine 304 is a hydrocarbon fuel-based reciprocating piston internal combustion engine, although other engine types such as continuous combustion or turbine engines may be used. When the engine 304 is in operation, the engine 304 rotates the shaft 308. The shaft 308 rotates windings within the generator 306, thereby producing electrical power. The generator 306 produces an electrical power output 310 during operation of the engine 304. The engine 304 and the generator 306 can be a single unit or can be separate units, the presently disclosed subject matter not being limited to any particular engine/generator configuration. Further, the generator 306 may produce alternating current or direct current electrical power the presently disclosed subject matter not being limited to any particular type of electrical power output 310 generated. It should further be noted that the presently disclosed subject matter is not limited to uses whereby the engine 304 is used to produce electrical power via a generator 306. The presently disclosed subject matter includes uses of the engine 304 whereby the engine 304 provides other forms of power, such as motive force through a drivetrain to move a vehicle, rotate a propellor, and the like.

As shown, the system 300 further includes a compressor 312 operably connected to the engine 304. The compressor 312 is fluidly connected to an inlet of the engine 304 and is configured to compress an engine operating fluid 313 provided through an inlet duct 314. The engine operating fluid 313 in the embodiment shown is a mixture of natural gas 325, reformed fuel 315 introduced through a recirculation conduit 322, and air 317 introduced through an air inlet 320. The natural gas 325, which is primarily methane but can include other naturally occurring gases such as carbon dioxide, nitrogen, hydrogen sulfide, or helium, can be provided by various sources including, but not limited to, natural gas from mining operations. The natural gas 325, which is provided through a gas conduit 324, is mixed with the air 317 in a mixer 316. The mixer 316 is a gas mixer that receives two or more gases, such as the air 317 and the natural gas 325 and combines (or blends) the gases. The mixture of the air 317 and the natural gas 325 is added to the reformed fuel 315 in a mixed conduit 318 and compressed by the compressor 312 for introduction to the engine 304 through the inlet duct 314 as fuel for the engine 304. In some examples, the mixed conduit 318 acts as a mixer (or blender) whereby the fluids (or gases) entering the mixed conduit 318 combine through the movement of the gases in the mixed conduit. Exhaust gas 326 created during operation of the engine 304 passes through a turbine 328, whereby the exhaust gas 326 expands in the turbine 328. The expansion of the exhaust gas 326 rotates the shaft 329. The rotation of the shaft 329 rotates compressor blades (not shown) of the compressor 312, compressing the mixture of the air 317, the natural gas 325, and the reformed fuel 315. The expanded exhaust gas 326 leaving the turbine is expelled into an exhaust conduit 330. From the exhaust conduit, the expanded exhaust gas 326 is directed to the carbon capture device 302 through capture conduit 332 or to the atmosphere through exhaust outlet 334.

The engine 204 is associated with a hydrogen production module (HPM) 336. The HPM 336 advantageously communicates and is operably associated with the engine 304 to, together, define the system 300. The HPM 336 includes various components that selectively and scaleably produce, refine and/or purify or separate hydrogen gas from gaseous fuel, for example the natural gas provided through the gas conduit 324 or reformer natural gas 338 through reformer gas conduit 340. In the example illustrated, the HPM 336 includes a reformer catalyst module 342 as part of the HPM 336. In some examples, the reformer catalyst module 342 includes a partial oxidation reformer (POx-R) catalyst that converts rich gaseous fuel-air mixture at high temperature to a hydrogen-rich reformate 343. A recuperator 344, a heat exchanger, is used to preheat fluid moving into the reformer catalyst module 342. In some examples, the recuperator 344 is a heat exchanger that uses tubes to allow the transfer of heat from one fluid to the other. In the example illustrated, heat is exchanged between the intake gas 349 and reformate 343 flowing from the reformer catalyst module 342. In this manner, the conversion efficiency at the reformer catalyst module 342 can be increased. A hydrogen selective membrane 345 receives the reformate 343 from the reformer catalyst module 342, which may still be heated or reheated, and extracts between 0% and 75% of the hydrogen from the reformate 343. The extracted hydrogen gas 348, which is pure hydrogen gas ($H_2$), is provided at a dedicated conduit and can be collected for storage or removal off system. The reformed fuel 315 is a hydrogen-depleted tail gas mixture, which may contain traces of hydrogen, carbon monoxide, nitrogen, and the like. As noted above, the reformed fuel 315 is combined with the natural gas 325 and air 317 as fuel for the engine 304.

In FIG. 3, the pressure to operate the hydrogen production module 336 is provided by the exhaust gas 326 rather than the intake gas illustrated by way of example in FIGS. 1 and 2. A portion of the exhaust gas 326 is mixed with the reformer natural gas 338 and introduced to the recuperator 344. Because the temperature of the exhaust gas 326 can be relatively high, it may be necessary to provide a portion of the intake gas 349 through the reformer intake 350 from the inlet duct 314 to maintain a temperature in the reformer catalyst module 342, as the chemical reactions in the reformer catalyst module 342 can be exothermic. The portion of the intake gas through the reformer intake 350 can reduce the temperature of the fluid entering the reformer catalyst module 342, thereby maintaining the temperature of the reformer catalyst module 342 below a high setpoint.

The HPM 236 can be used for various purposes. For example, the HPM 236 can be used to produce the hydrogen gas 348 for other systems or uses. In another manner, the HPM 336 can be used in conjunction with the carbon capture device 302. As noted above, during the operation of the engine 304, various GHGs are produced, including carbon dioxide and water vapor. During use, the presence of water vapor can affect the operation of the carbon capture device 302. For example, in an amine carbon capture (scrubbing) system, water is often added to the solution used in the scrubber to remove water vapor. An excess of water vapor can cause an increased amount of water absorbed into the amine solution and potentially saturating the solution to a point where both the water vapor and carbon dioxide are not absorbed into the solution as well as desired or expected. Further, if not captured, as noted above, water vapor itself is a major GHG. Hydrogen present in the reformed fuel 315 can increase the amount of hydrogen in the fuel to the engine 304. When combusted in the presence of oxygen, hydrogen combines with the oxygen to form water vapor. While in some examples, a portion of hydrogen is maintained to help stabilize the combustion of the engine 304, the HPM 336 is used to control the amount of hydrogen to maintain a concentration of water vapor introduced into the carbon capture device 302.

To control the amount of water vapor generated from the operation of the engine 304, the HPM 336 increases or decreases an amount of the hydrogen gas 348 removed by the hydrogen selective membrane 345, thereby controlling the amount of water vapor generated. As noted above, hydrogen may still be desired as a part of the fuel of the engine 304 to stabilize combustion within the engine 304. The HPM 336 uses a reformer flow control valve 346 to adjust the pressure in the HPM 336 and a catalyst bypass valve 347 to control the amount of gases entering the reformer catalyst module 342, described in more detail below.

To control the amount of the hydrogen gas 348 separated by the hydrogen selective membrane 345, the catalyst bypass valve 347 is used. The catalyst bypass valve 347 selectively permits fluid to flow into the reformer catalyst module 342 or in whole or in part bypass the reformer catalyst module 342. The amount of fluid bypassing the reformer catalyst module 342 changes the amount of the hydrogen gas 348 produced, thereby changing the amount of water vapor produced during combustion. When allowed to enter the reformer catalyst module 342, the reformer catalyst module 342 produces an amount of the hydrogen gas 348 relative to the bypass position of the catalyst bypass valve 347. When in a fully bypassed position, no hydrogen gas 348 is produced because no fluid enters the reformer catalyst module 342. When in a non-bypassed position, whereby no fluid bypasses the reformer catalyst module 342, the reformer catalyst module 342 produces an amount of the hydrogen gas 348 of which the reformer catalyst module 342 is capable of producing. Adjusting the position of the catalyst bypass valve 347 from a fully bypassed position to a non-bypassed position adjusts the amount of the hydrogen gas 348 produced and separated by the hydrogen selective membrane 345.

The system 300 uses the catalyst bypass valve 347 to adjust the amount of the hydrogen gas 348 produced. Decreasing the amount of the hydrogen gas 348 produced increases the amount of the hydrogen present in the fuel to the engine 304, thereby increasing the amount of water vapor present in the exhaust of the engine 304. Similarly, increasing the amount of the hydrogen gas 348 produced decreases the amount of the hydrogen present in the fuel to the engine 304, thereby decreasing the amount of water vapor present in the exhaust of the engine 304. FIG. 3 uses stoichiometric calculations to determine an expected amount of water vapor to be produced by the engine 304.

A hydrogen control module 354 calculates an amount of water vapor produced by the engine 304 using various methods. For example, an estimated amount of water vapor produced can be calculated using the electrical power output 310, a power level of the engine 304, the amount of the hydrogen gas 348 being produced, and/or the volumetric flowrate of the natural gas 325 and the reformer natural gas 338. The amount of the hydrogen gas 348 produced and the volumetric flowrates of the natural gas 325 and the reformer natural gas 338 provide the amount of hydrogen introduced as fuel into the engine 304. The electrical power output 310 is correlated to combustion efficiency of the engine 304, providing an estimate of the water vapor produced in the engine 304. In another example, a ratio between a power level of the engine 304 and the hydrogen gas 348 can be used to determine water vapor generation based on stoichiometric ratios of the combustion process.

The hydrogen control module 354 determines if the calculated water vapor is above a threshold (high setpoint), below a threshold (low setpoint) or within a desired range. If the hydrogen control module 354 determines the water vapor is above the high setpoint, the hydrogen control module 354 sends a signal 356 to increase the bypass position of the catalyst bypass valve 347, reducing the amount of the hydrogen gas 348 produced, and thereby reducing the amount of water vapor produced by the engine 304. If the hydrogen control module 354 determines the water vapor is below the low setpoint, the hydrogen control module 354 sends the signal 356 to decrease the bypass position of the catalyst bypass valve 347, increasing the amount of the hydrogen gas 348 produced, and thereby increasing the amount of water vapor produced by the engine 304. In some examples, the hydrogen control module 354 also controls the amount of the fuel entering the HPM 336 or the pressure in the HPM 336 by controlling the position of the reformer flow control valve 346 by sending control signal 358 to control the position of the reformer flow control valve 346. Opening the reformer flow control valve 346 to a more open position decreases the pressure in the HPM 336 by increasing fluid flow through the reformer flow control valve 346, and conversely, closing the reformer flow control valve 346 to a more closed position increases the pressure in the HPM 336 by restricting the flow through the reformer flow control valve 346.

In FIG. 1, the recirculation conduit 122 and the components used to produce the hydrogen gas 148, e.g. the reformer catalyst module 142, the HPM 136, and the like, are configured to operate at a relatively low pressure. In FIG. 2, the recirculation conduit 222 and the components used to produce the hydrogen gas 248, e.g. the reformer catalyst module 242, the hydrogen production module 236, and the like, are configured to operate at a relatively higher pressure. In FIG. 3, the pressure for the components used to produce the hydrogen gas 348, e.g. the reformer catalyst module 342, the hydrogen production module 336, and the like, is provided by exhaust gases from the engine 304. In some examples, if an increased amount of hydrogen produced is desired, water can be added, illustrate by way of example in FIG. 4.

Figure 4:
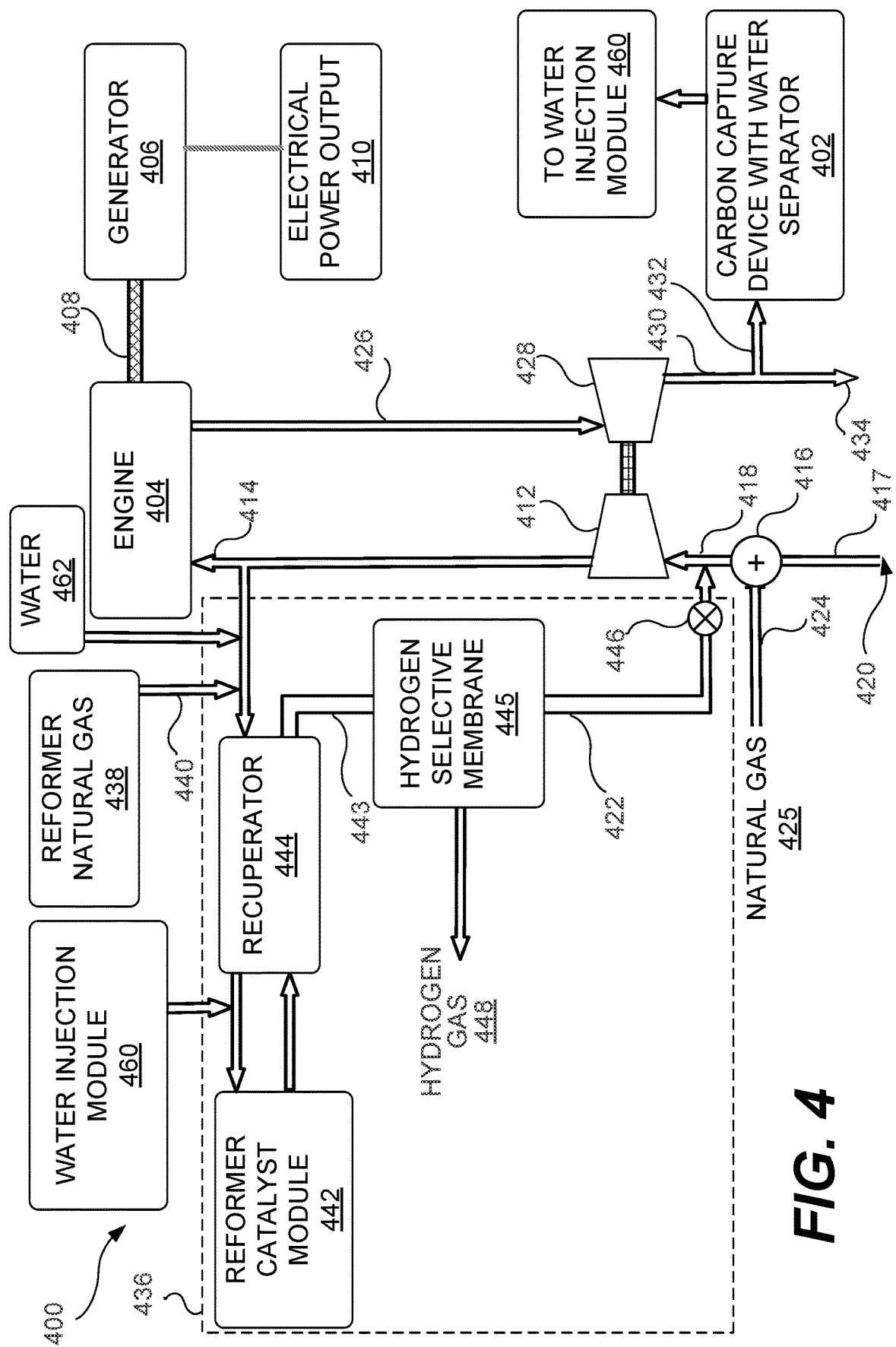
FIG. 4 is a schematic illustration of an intake pressure electrical power generation system with a carbon capture device using water injection, in accordance with examples of the presently disclosed subject matter.

FIG. 4 is a schematic illustration of an intake pressure electrical power generation system 400 with a carbon capture device and water injection, in accordance with examples of the presently disclosed subject matter. The carbon capture device 402 can use various technologies including, but not limited to, membrane, oxyfuel combustion, absorption, multiphase absorption, chemical looping combustion, calcium looping, and cryogenic capture devices. In some examples, carbon scrubbing with amines (a form of absorption) is used on vessels such as boats, work machines, vehicles, and industrial plants. The presently disclosed subject matter is not limited to any particular carbon capture technology.

The system 400 further includes an engine 404 and a generator 406. The engine 404 is rotatably attached to the generator 406 by shaft 408. The engine 404 is a hydrocarbon fuel-based reciprocating piston internal combustion engine, although other engine types such as continuous combustion or turbine engines may be used. When the engine 404 is in operation, the engine 404 rotates the shaft 408. The shaft 408 rotates windings within the generator 406, thereby producing electrical power. The generator 406 provides an electrical power output 410 during operation of the engine 404. The engine 404 and the generator 406 can be a single unit or can be separate units, the presently disclosed subject matter not being limited to any particular engine/generator configuration. Further, the generator 406 may produce alternating current or direct current electrical power the presently disclosed subject matter not being limited to any particular type of electrical power output 410 generated.

As shown, the engine 404 further includes a compressor 412, which compresses an engine operating fluid provided through an inlet duct 414. The engine operating fluid in the embodiment shown in a mixture provided by a mixer 416 through a mixed conduit 418, and comprises air provided through an air inlet 420 and hydrogen gas provided through a recirculation conduit 422 and air 417. A gaseous fuel to operate the engine 404, for example, natural gas or another gaseous fuel, is provided through a gas conduit 424 providing natural gas 425 to the engine 404, and exhaust gas 426 created during operation of the engine 404 passes through a turbine 428, which also provides the power to operate the compressor 412, before being expelled to the environment through an exhaust conduit 430 to the carbon capture device 402 through capture conduit 432 or to the atmosphere through exhaust outlet 434.

The engine 404 is associated with a hydrogen production module (HPM) 436. The HPM 436 advantageously communicates and is operably associated with the engine 404 to, together, define the system 400. The HPM 436 includes various components that selectively and scaleably produce, refine and/or purify or separate hydrogen gas from gaseous fuel, for example the natural gas provided through the gas conduit 424 or reformer natural gas 438 through reformer gas conduit 440. In one embodiment, the HPM 436 includes a reformer catalyst module 442 as part of the HPM 436. In some examples, the reformer catalyst module 442 is a partial oxidation reformer (POx-R) catalyst that converts rich gaseous fuel-air mixture at high temperature to a hydrogen-rich reformate. A recuperator 444 is provided to preheat fluid moving into the reformer catalyst module 442. A hydrogen selective membrane 445 receives the reformate 443 from the reformer catalyst module 442, which may still be heated or reheated, and extracts between 0% and 75% of the hydrogen from the reformate 343.

As noted above, during the operation of the engine 404, various GHGs are produced, including carbon dioxide and water vapor. During use, various carbon capture devices, such as the carbon capture device 402 of FIG. 4, work more efficiently if the amount of water vapor in the capture conduit 432 is reduced. To reduce the amount of water vapor produced by the engine 404, the concentration of hydrogen in the inlet duct 414 is reduced. As part of the combustion process, hydrogen burns in oxygen to form water, which at the high temperature/pressure found in internal combustion engines like the engine 404, vaporizes into water vapor. In some examples, the presence of water vapor (or liquid water if cooled) can cause issues such as carbon capture efficiency or effectiveness, with various carbon capture technologies. Further, if not captured, as noted above, water vapor itself is a major source of GHGs.

To reduce the amount of water vapor generated as a GHG from the operation of the engine 404, the hydrogen production module 436 can be used to remove at least a portion of hydrogen, thereby reducing the amount of water vapor generated. A reformer flow control valve 446 is used to control the flow rate through the reformer catalyst module 442. Opening the reformer flow control valve 446 increases the flow of fluids through the reformer catalyst module 442, thereby increasing an amount of hydrogen gas 448 produced, thereby reducing the amount of water vapor generated by the engine 404. Closing the reformer flow control valve 446 decreases the flow of fluids through the reformer catalyst module 442, thereby decreasing an amount of the hydrogen gas 448 produced, thereby potentially increasing the amount of water vapor generated by the engine 404. In some examples, the reformer flow control valve 446 also maintains a pressure in the recirculation conduit 422.

As noted above, in some examples, it may be desirable to increase the amount of the hydrogen gas 448 produced by the hydrogen production module 436. To increase the amount of the hydrogen gas 448 produced, the system 400 includes a water injection module 460. Adding water through the water injection module 460 increases the amount of hydrogen (as a component of the water) available for separation and removal through the hydrogen production module 436. However, as noted above, water vapor can reduce the efficacy of the carbon capture process. Therefore, in the example illustrated in FIG. 4, the carbon capture device 402 is further configured to separate water from the exhaust gases using water separator technologies. The water can be separated using various means including, but not limited to, water separators such as membrane separation and centrifugal separation. The separated water can be discharged or can be reused as the water for the water injection module 460. If the amount of water available for the water injection module 460 from the carbon capture device 402 is insufficient to produce a desired amount of hydrogen gas 448, a water makeup source, water 462, can also be used.

Figure 5:
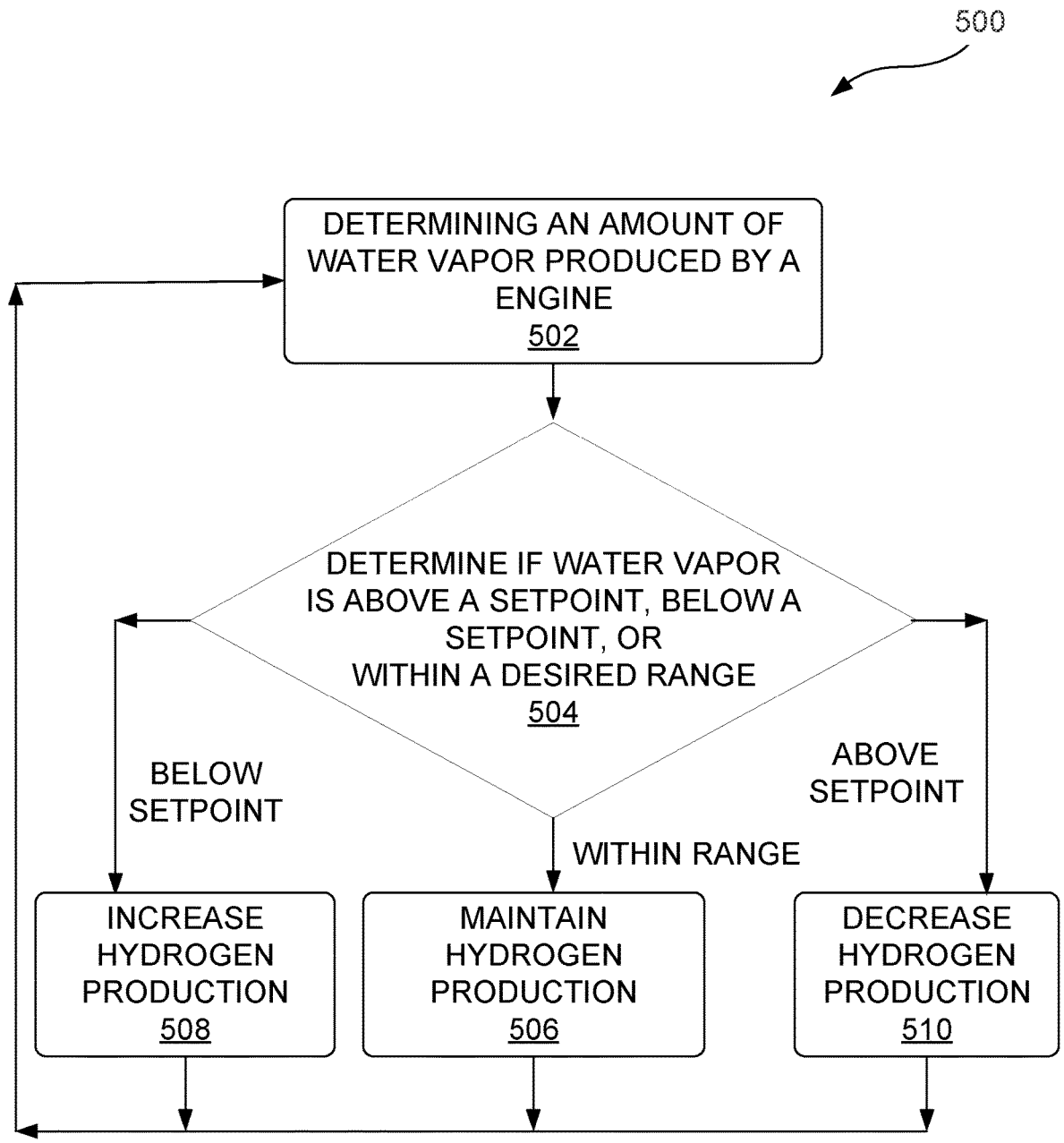
FIG. 5 is a flowchart illustrating a method of carbon capture, in accordance with examples of the presently disclosed subject matter.

FIG. 5 is a flowchart illustrating a method 500 of carbon capture, in accordance with examples of the presently disclosed subject matter. The method 500 may include different and/or additional steps, or steps may be performed in a different order than described herein. Further, the method 500 can be performed in whole or in part by one or more system controllers or processors, such as the hydrogen control modules 154, 254, and 354 of FIGS. 1-3, respectively.

At step 502, a hydrogen control module 154 determines an amount of water vapor produced by an engine. There may be several technologies for determining an amount of water vapor produced. In FIGS. 1 and 2, the water vapor detector 150 and the water vapor detector 250, respectively, measure an amount of water vapor entering their respective carbon capture devices. The water vapor detector 150 and the water vapor detector 250 produce a water vapor reading 152 and 252, respectively, that is transmitted to their respective hydrogen control module. In the example illustrated in FIG. 3, the hydrogen control module 354 uses operating conditions of the system 300 to calculate the amount of water vapor expected to be produced by the engine 304. In the example illustrated in FIG. 3, the operating conditions were the electrical power output 310, the amount of the hydrogen gas 348 produced, and the volumetric flowrates of the reformer natural gas 338 and the natural gas 325. In another example, a ratio between a power level of the engine 304 and the hydrogen gas 348 can be used to determine water vapor generation based on stoichiometric ratios of the combustion process. It should be understood, however, that other technologies for determining water vapor production can be used and is considered to be within the scope of the presently disclosed subject matter.

At step 504, the hydrogen control module 154 determines if the water vapor is above a setpoint, below a setpoint, or within a range or band. The hydrogen control module 154 can compare the water vapor reading 152 to a setpoint to make the determination. In other examples, the hydrogen control module 154 can determine an expected amount of water vapor using stoichiometric determinations of various fluids, as explained above. The presently disclosed subject matter is not limited to any particular manner of determination. The setpoints can be set to maintain a certain amount of hydrogen entering the engine 104 to stabilize combustion while reducing the amount of water vapor affecting the carbon capture device 102. Between the high setpoint and the low setpoint can be an operating band whereby the water vapor production is acceptable.

At step 506, if the hydrogen control module 154 determines that the water vapor is within a range or band, the hydrogen control module 154 maintains the operational parameters such as valve positions, flowrates, and the like. The method 500 continues to step 502 and repeated.

At step 508, if the hydrogen control module 154 determines that the water vapor is below a setpoint at step 504, the hydrogen control module 154 takes actions to reduce the amount of hydrogen extracted, thereby increasing the amount of hydrogen entering the engine 104, and consequently, increasing the amount of water vapor produced. The method continues to step 502 and repeated.

At step 510, if the hydrogen control module 154 determines that the water vapor is above a setpoint at step 504, the hydrogen control module 154 takes actions to increase the amount of hydrogen extracted, thereby decreasing the amount of hydrogen entering the engine 104, and consequently, decreasing the amount of water vapor produced. The method continues to step 502 and repeated.

INDUSTRIAL APPLICABILITY

The systems 100, 200, 300, and 400 described herein, and variations thereof, provide a means to increase the efficacy of carbon capture devices 102, 202, 302, and 402, respectively by reducing the amount of water vapor produced by the engine 104 during combustion. Hydrogen production modules change the amount of hydrogen gas extracted from a reformer stream that is mixed with air and natural gas 125 that fuels the engine 104. Thus, various examples of the presently disclosed subject matter can control the amount of water vapor produced by the engine by adjusting the amount of hydrogen extracted. This extracted hydrogen can be used at various locations (such as a customer site) to provide fuel to power hydrogen-fueled devices as well as potentially for sale for external use. The reforming system can produce the hydrogen using catalytic partial oxidation of super rich natural gas mixtures to produce "syngas," which is a mixture of carbon monoxide and hydrogen. The syngas can be used as fuel for combustion, chemical feedstock, and other uses.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system, comprising:
    an internal combustion engine comprising an intake and an exhaust, the intake being configured to receive an engine operating fluid comprising a mixture of air, natural gas, and reformed fuel, wherein the reformed fuel is provided by a hydrogen production module;
    a carbon capture device fluidly connected to the exhaust, the carbon capture device being configured to receive exhaust gas from the exhaust, and to remove carbon dioxide from the exhaust gas; and
    a hydrogen production module fluidly connected to the intake, and including a recirculation circuit having a reformer catalyst module, the hydrogen production module being configured to produce the reformed fuel by removing hydrogen gas from fluids in the recirculation circuit using the reformer catalyst module, the fluids comprising reformer natural gas, wherein:
        the hydrogen production module comprising a hydrogen control module configured to increase or decrease an amount of the hydrogen gas removed from the fluids to control a concentration of water vapor in the exhaust gas, wherein
        an increase in the hydrogen gas removed decreases an amount of hydrogen gas in the engine operating fluid, thereby decreasing the concentration of water vapor in the exhaust gas, and wherein
        a decrease in the hydrogen gas removed increases the amount of hydrogen gas in the engine operating fluid, thereby increasing the concentration of water vapor in the exhaust gas.

2. The system of claim 1, wherein the hydrogen control module is further configured to:
    cause a catalyst bypass valve to open, thereby causing the reformer natural gas to bypass the reformer catalyst module, and decreasing an amount of hydrogen gas produced; and
    cause the catalyst bypass valve to close, thereby causing the reformer natural gas to enter the reformer catalyst module, and increasing an amount of hydrogen gas produced.

3. The system of claim 1, wherein the hydrogen production module further comprises a hydrogen selective membrane configured to extract the hydrogen gas produced by the reformer catalyst module.

4. The system of claim 1, further comprising a generator connected to a shaft of the engine, whereby rotation of the shaft rotates windings in the generator to generate an electrical power output.

5. The system of claim 1, further comprising a water injection module configured to inject water to increase hydrogen production by the reformer catalyst module.

6. The system of claim 5, wherein the water is provided by a water separator of the carbon capture device to a water injection module.

7. The system of claim 1, further comprising a water vapor detector configured to detect a concentration of water in the exhaust of the engine and provide a water vapor reading to the hydrogen production module, wherein the hydrogen production module uses the water vapor reading to increase, decrease, or maintain an amount of the hydrogen gas removed.

8. The system of claim 1, wherein the reformer catalyst is a partial oxidation reformer (POx-R) catalyst.

9. The system of claim 1, wherein the hydrogen control module is further configured to operate a flow control valve to control a pressure of the hydrogen production module.

10. A carbon capture system, comprising:
    an internal combustion engine connected to an inlet duct, the internal combustion engine including a shaft;
    a generator connected to the shaft of the engine and operable to produce an electrical power output when the engine is operating;

a carbon capture device configured to remove at least a portion of carbon dioxide from an exhaust of the engine;

a hydrogen production module configured to remove a hydrogen gas using a reformer catalyst from fluids in a recirculation conduit provided through the inlet duct to the engine, the, the fluids comprising reformer natural gas, wherein the hydrogen production module is configured to increase or decrease an amount of the hydrogen gas removed to control a concentration of water vapor in the exhaust of the engine; and a water vapor detector configured to detect a concentration of water in the exhaust of the engine and provide a water vapor reading to the hydrogen production module, wherein the hydrogen production module uses the water vapor reading to increase, decrease, or maintain an amount of the hydrogen gas removed.

11. The carbon capture system of claim 10, wherein the fluids further comprise an exhaust gas from the engine.

12. The carbon capture system of claim 10, wherein the fluids further comprise intake gas to maintain a temperature of a reformer catalyst.

13. The carbon capture system of claim 10, wherein the fluids further comprise water injected into the fluids to increase an amount of the hydrogen gas removed, wherein the water is provided by a water separator of the carbon capture device to a water injection module.

* * * * *